United States Patent [19]

Ndebi et al.

[11] Patent Number: 5,141,333
[45] Date of Patent: Aug. 25, 1992

[54] THERMOCOUPLE DEVICE FOR MONITORING THE TEMPERATURE OF A MOVING SURFACE

[75] Inventors: Sylvain L. Ndebi; Robert D. Bobo, both of Rochester; Socrates Hryhorenko, Sodus, all of N.Y.

[73] Assignee: Eastman Kodak Company, Rochester, N.Y.

[21] Appl. No.: 691,887

[22] Filed: Apr. 26, 1991

[51] Int. Cl.⁵ ............................................. G01K 13/08
[52] U.S. Cl. .................................. 374/153; 136/230; 374/179
[58] Field of Search ................................. 374/153, 179

[56] References Cited

U.S. PATENT DOCUMENTS 2,947,171 8/1960 Peltola .
3,534,610 10/1970 Pruden ................................ 374/153

FOREIGN PATENT DOCUMENTS 869562 3/1953 Fed. Rep. of Germany ...... 374/153
40161 3/1977 Japan ................................. 374/153

*Primary Examiner*—Daniel M. Yasich
*Attorney, Agent, or Firm*—Leonard W. Treash

[57] ABSTRACT

A device for monitoring the temperature of a moving surface, particularly the outside surface of a heated roller in a toner fusing apparatus, includes a roller which rolls on the surface as it moves. The roller is virtualy entirely made up of two thermocouple materials. Because the materials themselves directly engage the surface being monitored, the device has a fast response to temperature change of the surface.

5 Claims, 1 Drawing Sheet

THERMOCOUPLE DEVICE FOR MONITORING THE TEMPERATURE OF A MOVING SURFACE

FIELD OF THE INVENTION

This invention relates to a device for monitoring the temperature of a moving surface. The invention is particularly useful in monitoring the temperature of a roller in a toner fusing apparatus.

BACKGROUND ART

Our prior U.S. Pat. No. 5,019,692, issued May 28, 1990 describes a problem in monitoring the surface of a roller in a heated pressure roller fuser. Typical contact monitors in such devices involve a thermistor embedded in or in contact with a carbon shoe that rides on the surface of the roller. The carbon shoe is used to reduce wear to both the roller surface and the sensing device. However, the carbon slides on the roller and both it and the roller wear. In our prior application we disclosed a roller sensing device in which a metallic roller rolls on the surface to be monitored and contains a variety of structures inside which monitors the temperature of the roller. This greatly reduces wear to both the heated roller and the sensing device.

Temperature control of heated roller fusers has always been adversely affected by any delay in response time of a device sensing the fusing surface. Delay in sensing temperature change causes the phenomena of "droop" and "overshoot" well known to those in the art.

U.S. Pat. No. 2,947,171, Peltola, issued Aug. 2, 1960, also shows a roller temperature sensing device containing a thermistor on the roller axis. This device requires full heating of the entire arrangement including heating of the air inside the roller to fully sense an increase in temperature. This aspect of its design adversely affects its response time.

It would be desirable to improve both the response time and the cost of these prior devices.

SUMMARY OF THE INVENTION

It is the object of the invention to provide a roller type device for sensing the temperature of a moving surface which device has a fast response and is inexpensive to manufacture.

This and other objects are accomplished by a roller sensor which rolls on the moving surface. The roller sensor is made up of at least two thermocouple and shaped and positioned to simultaneously contact the surface to be monitored as the roller rolls on that surface. A change in voltage between the thermocouple materials caused by a change in temperature of the moving surface is electrically monitored to provide an indication of change in temperature of the moving surface.

According to a preferred embodiment of the invention, virtually the entire roller is constructed of two thermocouple materials arranged side-by-side.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
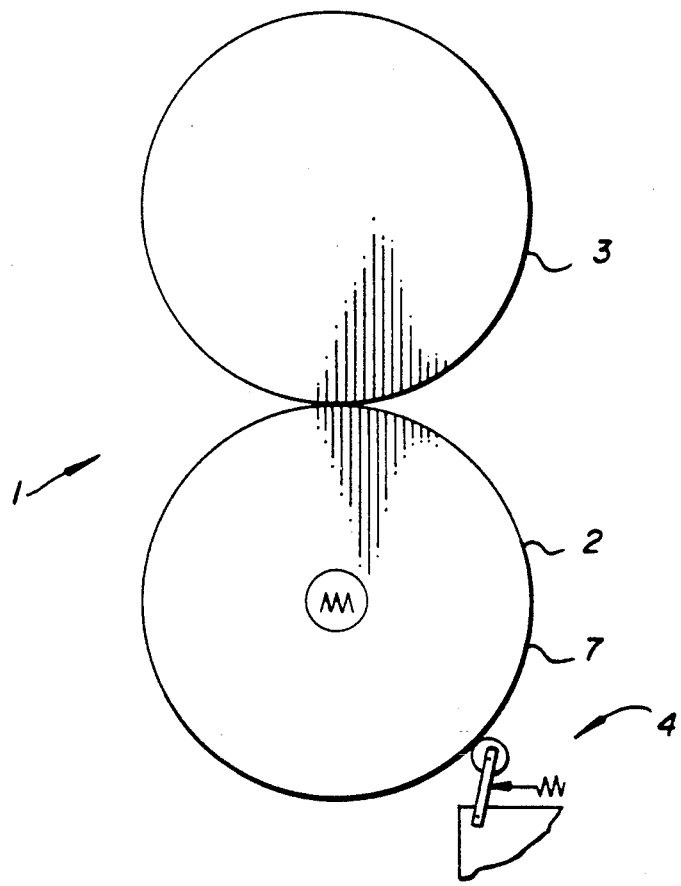
FIG. 1 is a first schematic of a fusing apparatus for fixing toner images to a receiving sheet and illustrating the use of a temperature monitoring device for monitoring the temperature of a surface of a roller which roller forms a component of the fusing apparatus.

According to FIG. 1 a conventional heated roller fuser 1 includes a heated fusing roller 2 and a pressure roller 3 well known in the art. Typically, fusing roller 2 is internally heated to a temperature sufficient to soften toner on a sheet fed between the rollers 2 and 3. Roller 2 can be made of an aluminum core covered by relatively thick silicone rubber elastomer having an outside surface 7 which is resistant to offset of toner. Pressure roller 3 can also have an aluminum core and an outside surface also resistant to offset of toner. Fusing apparatus are also known in which the roller contacting the backside of the sheet. It is also known to heat both rollers and to fuse toner images on both sides of the sheet simultaneously. In such devices it is known to cover both rollers with different thicknesses of compliant material. This invention is usable in all such fusing apparatus.

At least one roller is heated either softening toner. An important aspect of a good fuser is careful control of the surface temperature of both rollers, particularly the roller contacting the toner to be fused.

A roller sensing device 4 is spring urged into continuous contact with surface 7 and is rolled by surface 7 as roller 2 rotates. Device 4 has the substantial advantage of causing negligible wear to either itself or to surface 7.

Prior roller sensing devices which position a thermistor axially within the roller require full heating of the air inside the roller before a temperature change can be monitored. Any delay in response time will necessarily cause an overshoot or droop in control of the temperature of surface 7.

Figure 2:
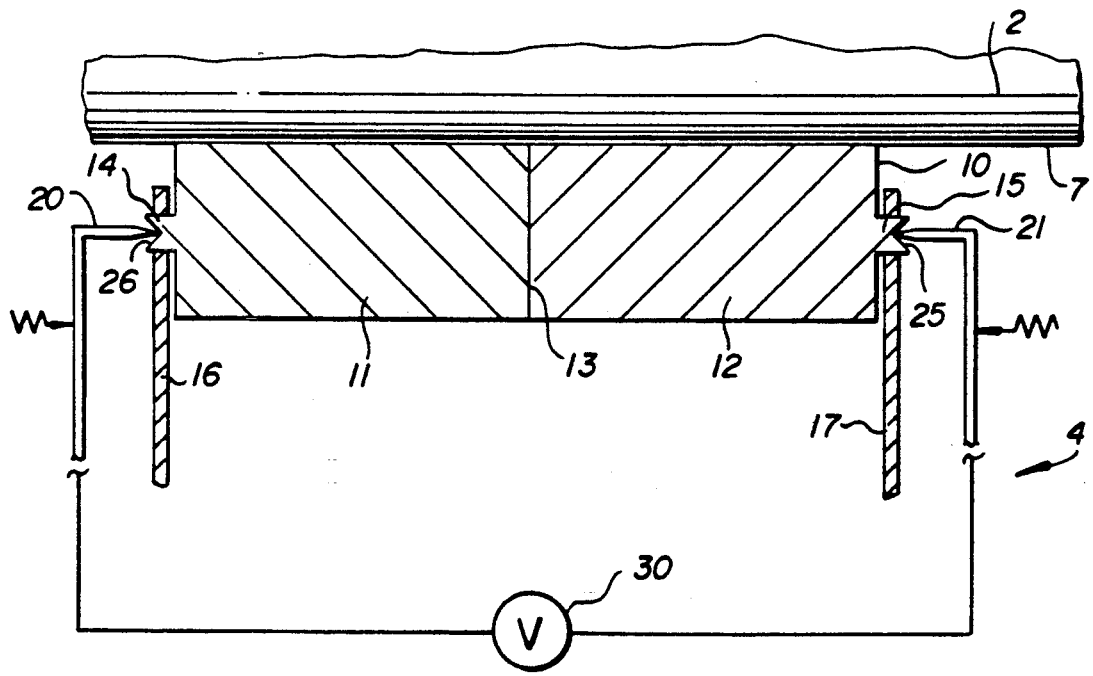
FIG. 2 is a side section of the temperature sensing device shown in FIG. 1 with some portions shown schematically.

Referring to FIG. 2 the response time can be substantially improved in a roller sensing device 4 by manufacturing a roller 10 entirely from two thermocouple materials 11 and 12. Materials 11 and 12 can be any suitable thermocouple material, for example, a J-type thermocouple made of iron and constantan. According to FIG. 2, an iron cylinder 11 is connected to a constantan cylinder 12 at a thermocouple junction 13 to form a solid thermocouple 10 which rolls directly on surface 11.

According to a preferred embodiment an electrical connecting means 14 is also made of iron and extends axially from iron cylinder 11 while the constantan electrical connecting means 15 extends from the constantan cylinder 12. Connectors 14 and 15 also contain external cylindrical bearing surfaces which are held by yoke arms 16 and 17 for rotation as roller 10 rolls on surface 7. Connecting means 14 and 15 include axial indentations 26 and 25 into which electrical connecting needles 20 and 21 are spring urged. Connectors 20 and 21 are connected to a volt meter 30 which directly senses changes in potential between the opposite ends of roller 10 caused by a heat change at the thermocouple junction 13.

As is well known in the thermocouple art, needle connectors 20 and 21 as well as the material forming the circuit to volt meter 30 can be of a third material, for example copper, without destroying the thermocouple effect. Similarly, connecting means 14 and 15 can also be of copper or another third conductive material different from materials making up cylinders 11 and 12.

Yoke arms 16 and 17 should not be conductive. For example, they could be made of a polystyrene and covered with tetrafluoroethylene where they contact the cylindrical bearing surfaces of connecting means 14 and 15, which bearing surfaces can also be covered with tetrafluoroethylene.

This structure has the substantial advantage of having the temperature responsive part of the device, namely cylinders 11 and 12, in direct contact with surface 7 providing extremely rapid response time to changes in temperature of surface 7. In addition to its rapid response, sensing device 4 is extremely simple to manufacture and, therefore, inexpensive.

Preferably, roller 10 is quite small compared to roller 2. For example, roller 2 can be three inches in diameter, while roller 10 is between ¼ and ⅜ of an inch in diameter. With such a small roller 10, changes in temperature of surface 7 are quickly indicated at meter 30.

The invention has been described in detail with particular reference to a preferred embodiment thereof, but it will be understood that variations and modifications can be effected within the spirit and scope of the invention as described hereinabove and as defined in the appended claims.

We claim:

1. A device for monitoring the temperature of a surface, which surface is moving with respect to the device, said device comprising:
    a roller having an axis of rotation and opposite ends and adapted to roll on the moving surface to be monitored, and
    electrical connecting means at the opposite ends of the roller,
    characterized in the the roller includes at least two thermocouple materials arranged, side by side to define a thermocouple junction, both of said thermocouple materials positioned to simultaneously and continuously contact the surface to be monitored as said roller rolls on such surface and each of said materials being respectively electrically connected to a different one of said connecting means and said device further including means connected to said electrical connecting means for monitoring a change in an electrical parameter associated with said connecting means.

2. The device according to claim 1 wherein each thermocouple material is made of the same material as its connecting means.

3. The device according to claim 1 wherein the two electrical connecting means are made of the same material, which material is different from each of said thermocouple materials.

4. The device according to claim 1 wherein said roller is made of at least two solid cylinders each of said cylinders being composed entirely of a different one of said thermocouple materials.

5. A fusing apparatus for fixing toner images on a sheet, said fusing apparatus including a heated rotatable roller having an outside cylindrical surface and a device for monitoring the temperature of the outside cylindrical surface of the heated roller, said device including:
    a temperature sensing roller mounted to roll on said outside surface as said heated roller rotates, characterized in that said sensing roller consists essentially of a thermocouple of two separate and different thermocouple materials, each material defining an outer cylindrical surface positioned to contact and roll on said outside cylindrical surface of said roller and means for sensing a difference in electrical potential between said thermocouple materials.

* * * * *